June 1, 1965  L. A. KILLE  3,187,170
ELECTRONIC FLASH APPARATUS

Filed June 20, 1962

INVENTOR.
Leonard A. Kille
BY Brown and Mikulka
ATTORNEYS

June 1, 1965  L. A. KILLE  3,187,170
ELECTRONIC FLASH APPARATUS
Filed June 20, 1962  5 Sheets-Sheet 5

INVENTOR.
Leonard A. Kille
BY
Brown and Mikulka
ATTORNEYS

United States Patent Office 3,187,170
Patented June 1, 1965

3,187,170
ELECTRONIC FLASH APPARATUS
Leonard A. Kille, Stoneham, Mass., assignor to Polaroid Corporation, Cambridge, Mass., a corporation of Delaware
Filed June 20, 1962, Ser. No. 203,996
5 Claims. (Cl. 240—1.3)

The present invention relates to improvements in flash photography and more particularly to a portable flash device for use with photographic cameras.

It is a prime object of the present invention to provide a novel and improved portable self-contained flash device.

It is a further object of the present invention to provide such a device having a carrying means which forms a part of a housing means wherein said carrying means provides a storage means for light support means.

It is an additional object of the present invention to provide such a device having a storage means contained therein proximate to an access means at the front of said device.

Other objects of the invention will in part be obvious and will in part appear hereinafter.

The invention accordingly comprises the apparatus possessing the construction, combination of elements, and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

The use of remote flash means for optimum illumination of photographed subjects is an invaluable aid to quality photography. Oftentimes the preferred direction of lighting in relation to the positioning of the camera may require that one or more light sources be disposed remotely from the actual camera. In many cases, continuous incandescent flood lighting is not generally suited to such purposes, and low-cost flash bulbs are often found to be less convenient than repeatable high speed flash tube or strobe type light sources. The present invention contemplates a remote light source means for use with a camera which is triggered automatically and synchronously by operation of the camera shutter means. In one form thereof, the device is used in conjunction with a radio transmitting device located on a camera and actuated by operation of the camera shutter, and utilizes a receiver and associated electronic means for triggering the flash tube in response to signals emitted by the transmitter.

Figure 1:
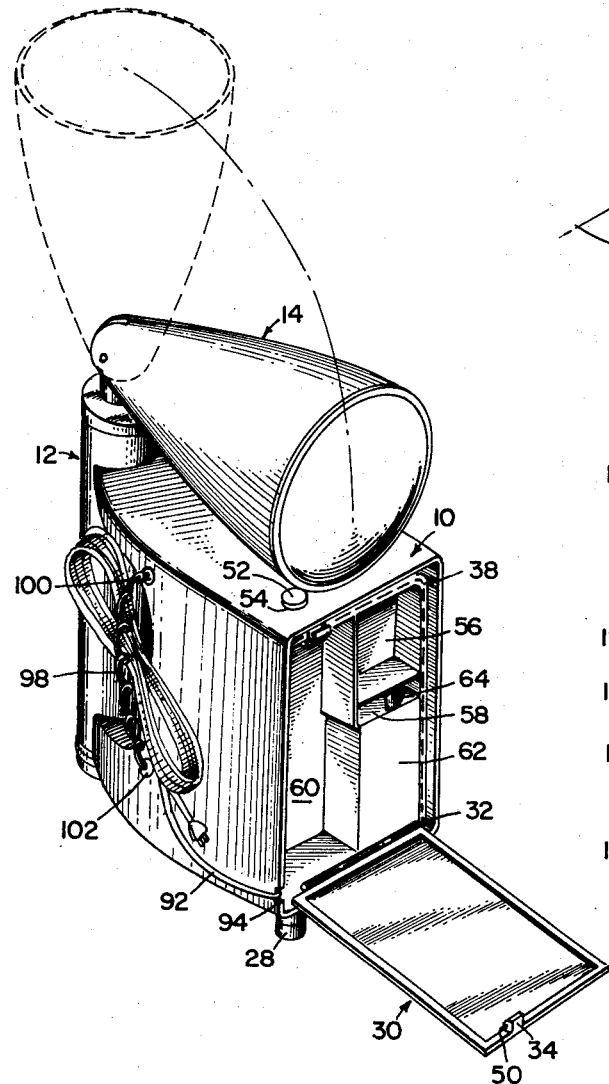
FIGURE 1 is a perspective view of the present invention with the door thereof open showing the front interior of the device.
Figure 5:
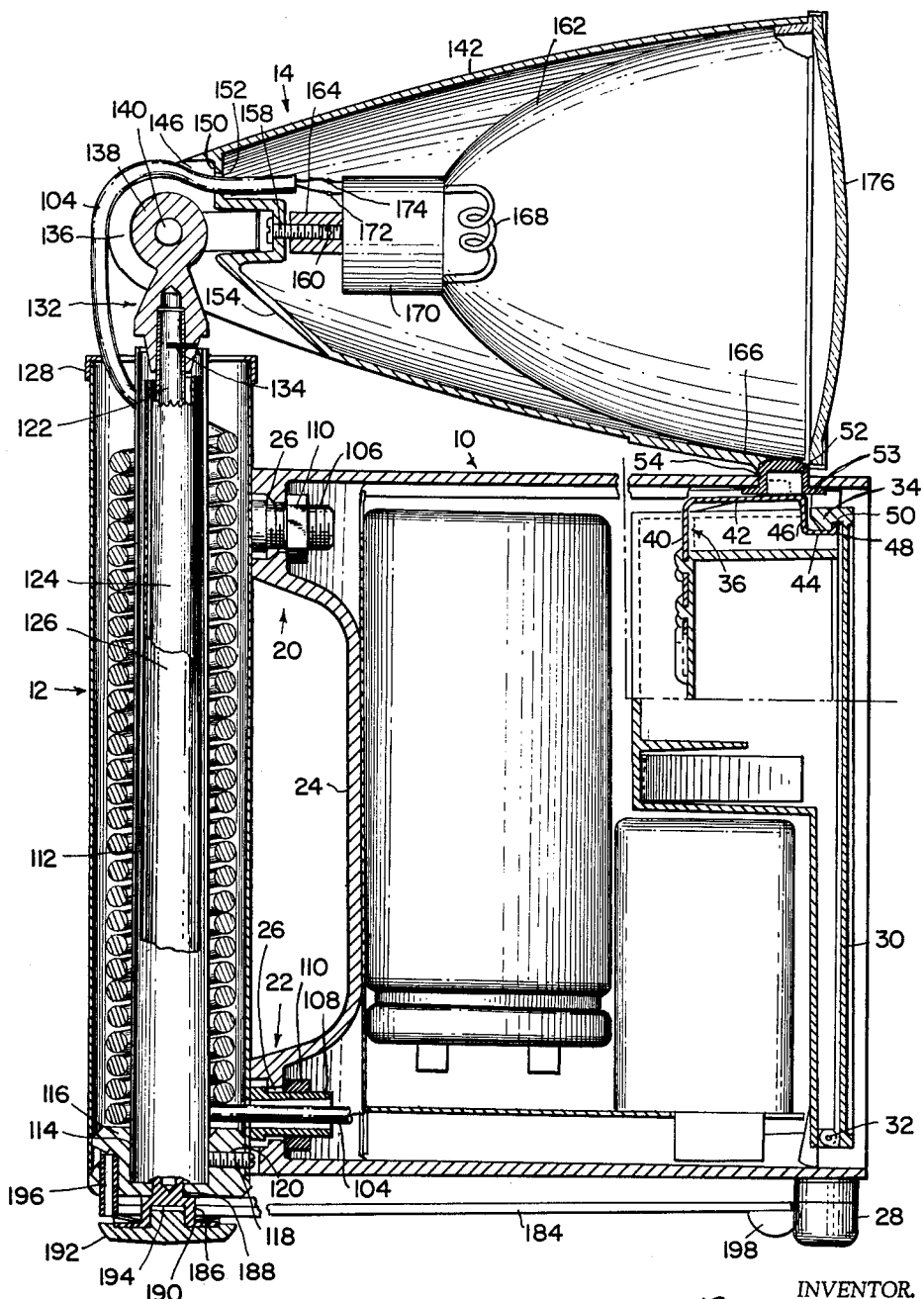
FIG. 5 is a cutaway view of the device taken along the vertical line 1—1 of FIG. 4.

Referring now to FIGURE 1, there is shown a compact portable flash device comprising a housing means 10, a carrying means in the form of cylinder 12 forming a part of said housing at the rear thereof, and a light means 14 which is mounted on a support means contained within the carrying means. Main housing 10 is formed from a molded material such as a plastic. The carrying means of the device may be integrally molded into housing means 10 or in a preferred embodiment be subsequently attached to the housing means. As shown in FIGURE 1 and further shown in FIG. 3, the sides 16 of the housing taper towards the rear of the housing to a semicylindrical concave surface 18 which is shaped to partially enclose cylinder 12. As shown in FIG. 5, the rear of housing 10 has a top portion 20 and a bottom portion 22 with a concave surface 24 molded in the housing therebetween. The top and bottom portions have holes 26 therein which allow fastening of the cylinder to the main housing. Main housing 10 has a pair of feet members 28 secured to the bottom front base section thereof. These feet are of a frictional material such as rubber and act to prevent slippage when the device is placed on a flat surface for operation.

Figure 7:
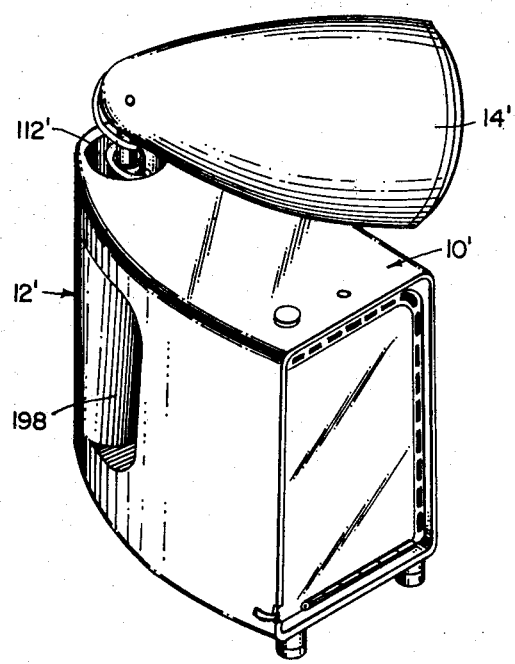
FIG. 7 is a side perspective view of another embodiment of the present invention.

As described briefly above, the carrying means may also be an integral part of the housing means as shown in FIG. 7. In this illustration a substantially cylindrical carrying means 12' is molded integrally into main housing 10' at the rear thereof. Carrying means 12' has a partial cavity 198 molded in each side of the rear of housing 10' whereby the cylindrical section may be conventionally grasped for carrying the device. This cavity is partially rounded at the rear thereof to continue the curvature of the cylindrical carrying means. The front part of the cavity is shaped to permit insertion of the carrier's fingers without interference and at the same time provide an eye pleasing configuration. Carrying means 12' has a hollow portion therein which serves as a storage means for a support means, in this case a telescopic mast 112', on which a flash means 14' is mounted. The device of the present invention may also comprise other shaped housing means wherein a carrying means is made a part of the housing means, the carrying means in all cases having some sort of hollow storage means which will substantially contain a support means, which support means may be readily extendable therefrom.

The main housing has an access means 30 located in the front thereof. This door is shown in detail in FIGURE 1 and FIG. 5. Door 30 is pivotally mounted within the main housing 10 at the lower front of an insertable molded member, located therein, by means of hinge 32, a portion of which is affixed to the insertable member and a portion to door 30. Door 30 has a latching portion 34. The latch comprises a small vertical section notched at the inner base thereof to receive a mating latching member 36 which is mounted by means of fastening pins on an insertable molded member 38 which will be more fully described below. Latch member 36 is essentially a spring device having a rear vertical support portion 40, an upper horizontal portion 42 and a U-shaped portion 44, one arm 46 of which is connected to the said horizontal portion and the other arm 48 of which engages notch 50 in door latch member 34. Latch member 36 is depressed by means of a button 52 which fits through a hole 54 in the top of main housing 10. The base 53 of button 52 rests against horizontal portion 42 of the latch and has an expanded lower area to prevent the button from falling out through hole 54. Depressing member 36 causes arm 48 to disengage from door latch 34 thereby allowing door 30 to open.

As mentioned above, latch 36 is fastened to an insertable molded member 38. This member is shown in detail in FIGURE 1 and FIG. 4. Member 38 is formed from a material such as plastic in a generally rectangular cup shape. When inserted in housing 10 the front area of member 38 provides a storage area. This area comprises area 56 wherein a device such as a miniature radio transmitter, normally mounted on a camera, may be stored when not in use; area 58 wherein a measuring means for determining lamp to subject distance may be stored; and a larger area 60 wherein an instruction manual or such may be stored. Of course, these particular areas may be used for other storage purposes consistent with their available space. A portion 62 of member 38 covers a power source contained within housing 10 and has its front surface substantially flush with access door 30 when the door is closed. Storage area 58 may have a spring device 64 located therein to hold such a measuring means in place.

Figure 3:
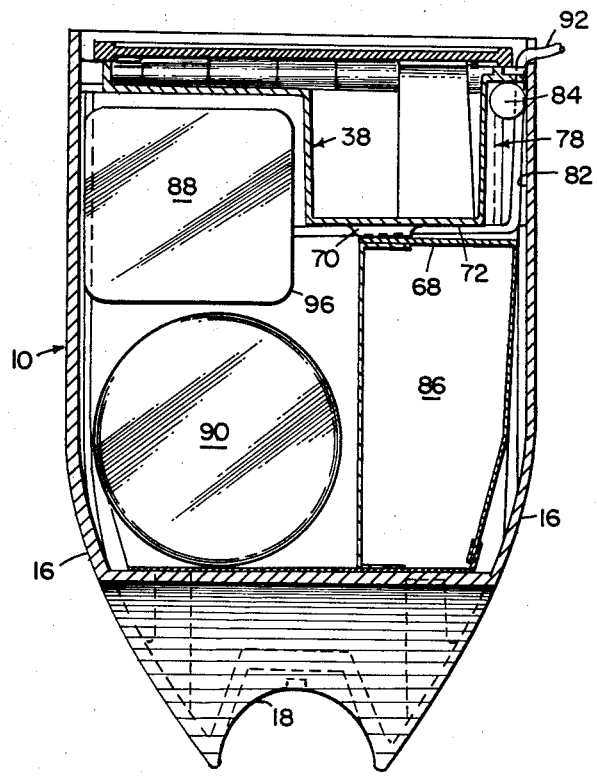
FIG. 3 is a top cutaway view of the device with the lamp means and the mast cylinder removed therefrom showing the arrangement of elements contained therein.
Figure 4:
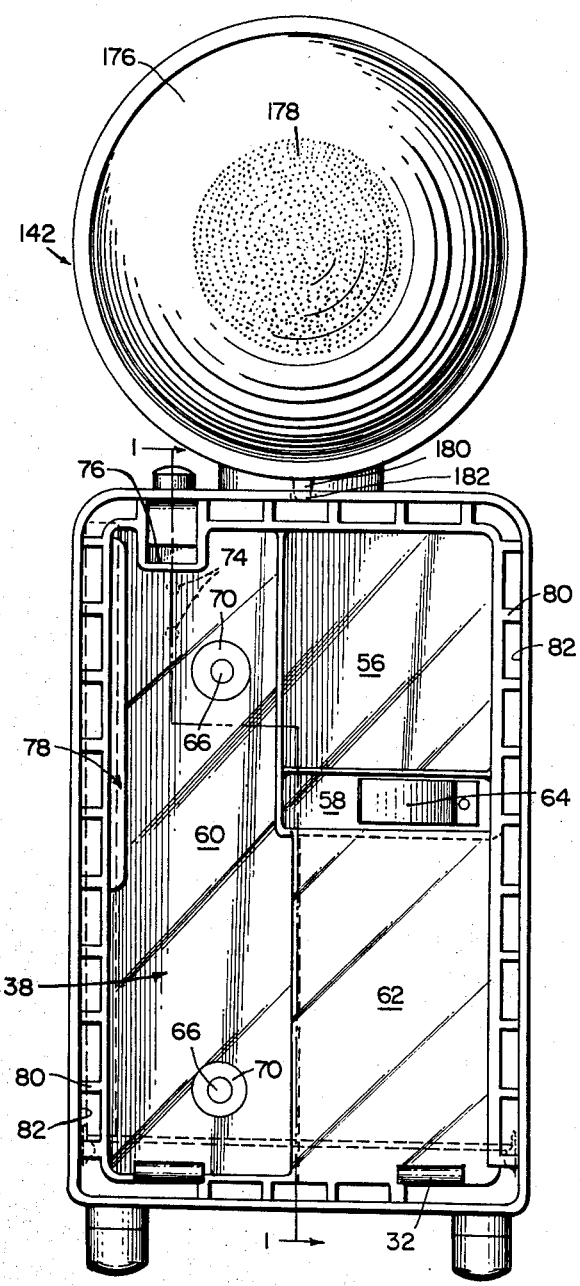
FIG. 4 is a front view of the device with the door thereof removed.

FIG. 4 is a front view of the device showing member 38 positioned within main housing 10. The member is secured within housing 10 by means of a fastening device such as a screw and nut passing through holes 66 in member 38 and connecting the member to a rigid body member, in this case a metallic shielding member 68 as illustrated in FIG. 3. Member 38 has a depressed section 70 around hole 66 such that a fastening device will not protrude within area 60. This protrusion also serves to separate the main portion of rear wall 72 of member 38 from supporting member 68 as shown in FIG. 3. A latching member 36, to hold access door 30 in a closed position, is secured to the rear wall 72 of member 38 by means of fastening pins 74 over which latch member 36 fits. Insert member 38 has a depressed section 76 molded therein, in which the latch member rests to contact door 30. Insert member 38 has a cavity 78 molded in the side thereof which encloses a receiving antenna which picks up the radiated actuation signals. Member 38 has a plurality of fins 80 along the outer sides of the insert member. The fins provide a pressure contact against the inner wall 82 of housing 10 to position and partially hold member 38 therein. As previously discussed, access door 30 is pivotally mounted on the lower front portion of member 38 at hinges 32. Besides providing a decorative effect around the front side portions of the device when the access door is closed, fins 80 provide an air circulation space to permit air to flow within the enclosed body of housing 10.

FIG. 3 is a top cutaway view of the device of the present invention illustrating the interior arrangement therein. A receiving antenna 84 is shown located within a cavity 78 in member 38 against inner wall 82 of housing 10. Actuating signals picked up by this antenna are fed to a known receiver means designated generally as 86. Signals thus picked up and amplified are fed to a trigger means which generates a flash signal. A portion of this trigger means is shown as internal power source 88 and capacitor 90.

U.S. Patent No. 2,408,764 issued October 8, 1946, in the name of Harold Edgerton disclosed a general scheme for such a flash device actuated by a radiated signal in his FIG. 5 and the description thereof. Briefly stated, the trigger means of the present invention takes an actuation signal received by antenna 84 and receiver means 86 and after determining it is the correct signal, causes the signal to discharge a storage circuit through a flash tube, thereby momentarily energizing the tube. The particular electronic arrangement of both remote and actuating means of the present invention is more fully disclosed in the copending U.S. application Serial No. 203,988 filed June 20, 1962, and entitled Electronic Flash Photography.

The internal power source 88 is connected to an external source of power by means of a power cord 92 which passes through a cutout 94 in the front side of housing 10, as shown in FIGURE 1, the cord passing between insert member 38 and the inner wall 82 of housing 10. When not in use, power cord 92 may be conveniently coiled and stored by insertion under an elastic member 98 which is attached to the outside of main housing 10 at points 100 and 102. Receiving means 86 and power source 88 are appropriately shielded electrostatically and magnetically respectively by shields 68 and 96 to prevent ambient and spurious signals from triggering the flash means.

Figure 2:
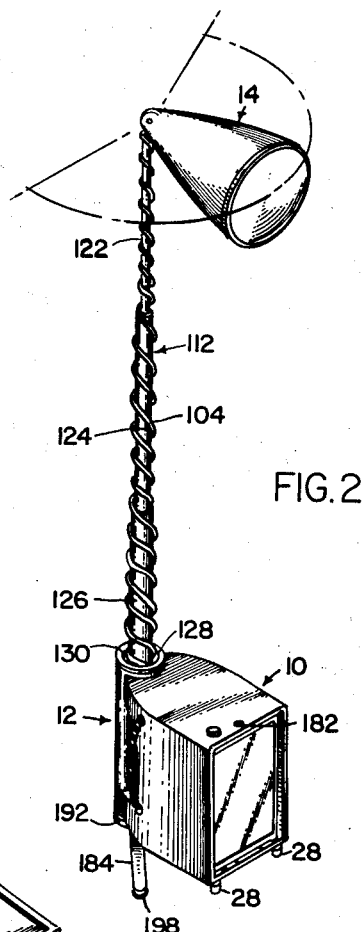
FIG. 2 is a perspective view of the invention as set up for use in a remote location with the mast contained therein extended for use.

Triggering signals are carried to a flash means through a wire 104 which is connected within main housing 10, passing into cylinder 12 and thence to flash means 14, as illustrated in FIG. 2 and FIG. 5. Cylinder 12 is vertically connected at the rear of housing 10 to a top portion 20 and a bottom portion 22 of the housing across a concave surface 24. The cylinder thus provides a convenient carrying means for the device. Cylinder 12 has bolts 106 and 108 permanently affixed thereto such that when the cylinder is fitted against portions 20 and 22, which partially enclose the cylinder, the bolts line up with corresponding holes 26 in the respective portions and pass therethrough such that they be secured within the housing by nuts 100. Bolt 108 is hollow and provides a passage for cord 104 to pass between housing 10 and cylinder 12 through a hole in the side wall of the cylinder.

Cylinder 12 also serves as a storage area for a collapsed telescopic mast 112. The mast is centrally located in the cylinder and fits into a cavity 114 in a block 116 which is fitted into the base of cylinder 12. A screw 118 is tightened against mast 112 through a threaded slot 120 in block 116 to hold the mast securely in position. Telescopic mast 112 comprises several sections which fit within each other. Sections designated as 122, 124, and 126 comprise a part of a known type of telescopic mast wherein several cylinders of diminishing diameter are nested within each other such that they are sequentially extendable; each section locking, when fully extended, to the next largest section such that the latter is withdrawn from the nest as the mast is further extended. These sections are shown as nested or in a collapsed state in FIG. 5 and as extended in FIG. 2. A flash means 14 is mounted at the top of the smallest section 122. Wire 104 is precoiled about mast 112 within cylinder 12. The wire is connected to flash means 14 such that extension of the mast causes the wire to partially uncoil as it is withdrawn from the cylinder. A view of the wire in the extended position is also shown in FIG. 2. A cap 128 is seated on the top of cylinder 12 to cover the edges thereof. The cap is primarily a protective device and has a large circular opening 130 in the center thereof to permit the mast 112 and coiled wire 104 to extend therethrough. The cap is preferably of a plastic material, although a metal may be used.

Figure 6:
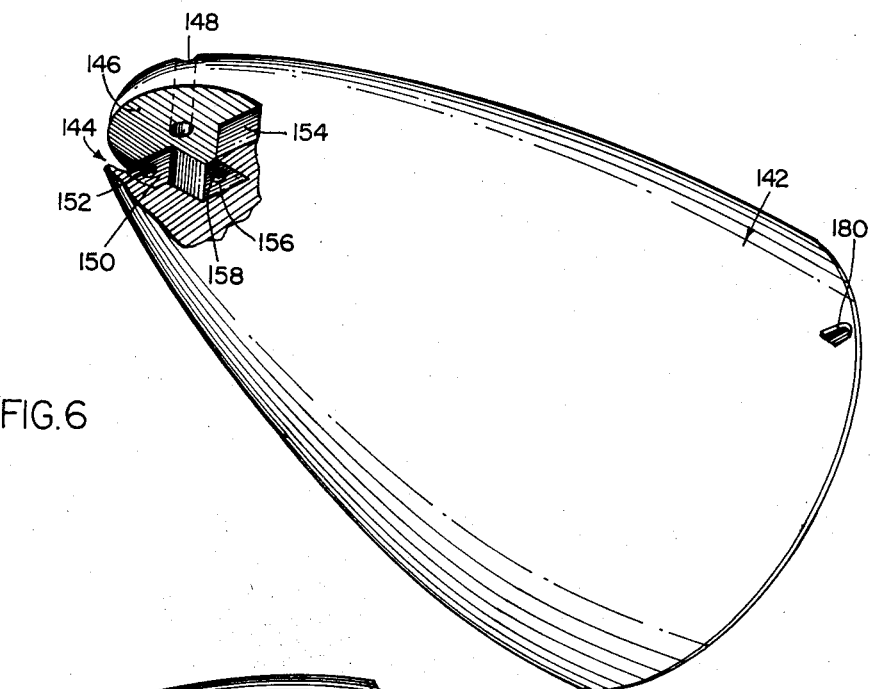
FIG. 6 is a bottom perspective partially cutaway view of the molded conical shield of the flash means of the present invention.

The detail of flash means 14 is illustrated in FIG. 5 and FIG. 6. The flash means is pivotally mounted at the top of section 122 of mast 112 by securing the means to a semiuniversal mount 132. Mount 132 fits on section 122 and is secured thereto by means of an expansion type pin 134 which is inserted in a hole in the side of mount 132 and a mating hole in the wall of section 122 to frictionally hold them together. Horizontal rotation of the mount, and therefore flash means 14, is restricted to approximately 160° by means of stops located in mast 112. Mount 132 is preferably made from a metallic material with a lower cone-shaped portion and a top portion 136. Top portion 136 is round with parallel flat sides 138. Sides 138 have a hole 140 at the center thereof through which flash means 14 is fastened to the mount.

The body of flash means 14 consists of a molded conical shield 142. Shield 142 is preferably of a plastic material although metal might also be used. The rear portion of the shield consists of a rounded apex section which has a slot 144 molded therein. Slot 144 is designed to fit about the top portion 136 of mount 132 such that the slot walls 146 are contiguous to the sides 138 of the mount. Shield 142 has a hole 148 in the rear thereof passing through the shield on both sides of slot 144. When top portion 136 is positioned within slot 144, a hole 140 in portion 136 is aligned with hole 148 such that a fastening device, such as a pin or a screw member, may be inserted through the aligned holes, thereby securing the shield to mount 132. The interior surface of slot 144, as shown in FIG. 6, consists of several surfaces. Surface 150 is substantially vertical to the center line of flash means 14 and is located above mount 132 when shield 142 is secured thereto. Surface 150 has an opening 152 therein through which wire 104 is passed to connect the flash tube to actuation means contained within main housing 10. Vertical rotation of shield 142 about mount top portion 136 is limited to approximately 110° or less by surface 150 and wire 104 passing therethrough. However, vertical rotation is sufficient to allow the flash means to be conveniently positioned for either direct or bounce flash. Surface 154 slopes away from mount 132 to prevent binding at the lower inside edges of slot 144. Surface 156 is depressed between surfaces 150 and 154 approximately at the center line of the flash means. There is a hole 158 in the center of surface 156 through which a screw 160 is passed to position and secure a flash reflector 162 within shield 142. Screw 160 is fastened within a threaded portion 164 which is an integral part of reflector 162. The reflector member is preferably of plastic with an inner metallized surface; however, a metal reflector may be utilized if desired. The inner surface 166 of the reflector acts to direct and focus the emitted light from a flash tube 168 which is mounted in the base portion 170 of reflector 162. Flash tube 168 may be a repeatable high speed flash lamp or preferably a strobe type tube. Wire 104 is connected to terminals, here designated as 172 and 174, on base portion 170 and serves to conduct a flash trigger signal to actuate lamp 168 from actuation means within housing 10. A front window 176 is fastened to shield 142 at the open front portion thereof. The window may be pressure fitted to the shield or fastened thereto by other means such as an adhesive compound. As shown in FIG. 4 window 176 preferably has a central frosted area 178 which is substantially circular. This area acts to diffuse the light emitted from flash tube 168 to eliminate so called "hot spots."

Shield 142 also has a slotted pin 180 extruded thereon at the lower front surface of the shield as illustrated in FIG. 6 and FIG. 4. Pin 180 fits into a corresponding indentation 182, shown in FIG. 2, in the top surface of housing 10 when the collapsible mast 112 is depressed, such that flash means 14 rests against the top of housing 10. The pin 180, when inserted in the indentation 182, makes a frictional contact with housing 10, thereby holding the flash means in a position for convenient carrying of the device.

In operation, the device is supported on a flat surface by means of a pair of stabilizing members, illustrated in FIG. 5 and also in FIG. 2, and rubber feet mounted on the base of main housing. Stabilizing support members 184 are pivotally mounted at the base of cylinder 12 around a pivot member 186. This member is fastened to the base of cylinder 12 through a centrally located hole 188 in block 116. The member 186 has an expanded lip 190 or head portion thereon which serves to hold support members 184 against the base of cylinder 12. A cap 192 of a frictional material, such as rubber, is pressure fitted within a cavity 194 in the top of pivot member 186. A pin 196 is secured within block 116 and extends vertically downward at the rear of cylinder 12. This pin serves as a stop to position and restrict movement of support members 184 within a predetermined arc of movement. The support members are normally located beneath housing 10 at the sides thereof. Support members 184 are slotted at the rear thereof such that they engage and are restricted by pin 196 located behind pivot member 186. When the device is to be operated, the support members are pulled from beneath housing 10 such that a member extends outwardly from each side at an angle of less than 90°. The support members have feet 198 of a material such as rubber, located at the outer ends thereof. In operation, the device rests upon a stabilized support platform, as shown in FIG. 2, comprising support members 184 and feet 198, cap 192, and housing feet 28 such that all contact points are in substantially the same plane.

The device of the present invention is thus seen to be a compact, conveniently portable, artificial light source which may be located proximate to or apart from a camera and is actuated by operation of the camera. It features a housing having a cylinder vertically connected across the rear thereof which contains a storage area for a collapsed telescopic mast upon which a flash means is mounted. The flash means is connected to an actuation means located within the main housing by means of a precoiled wire normally stored within the cylinder about the telescopic mast such that the wire is extendable with the mast. The flash means comprises a pivotally mounted molded shield containing a flash tube, reflector, and window. The housing also contains an insertable molded member in the front thereof to which an access door is fastened. The door opens to a plurality of storage areas. The insert member has fins along its outer periphery providing for circulation of air within the main housing. The device is set up for operation by locating it on a flat surface, extending stabilizing members pivotally mounted at the base of the cylinder, extending the mast, and positioning the flash means for the desired light incidence angle.

Since certain changes may be made in the above device without departing from the scope of the invention herein involved, it is intended that all matter contained in the above description or shown in the accompanying drawings shall be interpreted as illustrative and not in a limiting sense.

What is claimed is:

1. A portable flash device for remote use with photographic cameras comprising, in combination:
   a main housing formed from a molded material;
   a collapsible telescopic mast;
   an insertable molded member;
   a cylinder vertically connected to said housing at the rear thereof, said cylinder providing storage means for said mast;
   said housing having an access means thereto, said access means being a door pivotally mounted at the front of said housing, said access means permitting entry to one or more storage areas, said storage areas being formed within said insertable member;
   said insertable molded member being constructed of a substantially magnetically and electrically nonconductive material, said member having a plurality of fins molded on the outer sides thereof, said member fitting within said main housing, said member being located proximate to said access means, said fins providing an air circulation space between the inner wall of said housing and the outer sides of said insertable member; and
   a flash means pivotally mounted on the top of said mast, said means being secured to a semiuniversal mount located on the top of said mast.

2. A portable flash device for remote use with photographic cameras comprising, in combination:
   an insertable molded member;
   stabilizing support means;
   a main housing;
   a cylinder vertically connected to said main housing;
   a collapsible telescopic mast;
   said housing being constructed substantially of an electrically and magnetically nonconductive material, said housing containing a storage area at the front thereof, said storage area being formed within said insertable molded member, said housing having an access means to said storage area;
   said stabilizing support means consisting of a pair of members pivotally mounted at the rear of said housing base, each of said members being normally positioned beneath said base, each of said members being swingable out from beneath said base to stabilize said device, said support means including feet mounted on the base of said housing, the outer ends of said members and the pivot point of said members, and said feet, all being in substantially the same plane, said pivot point being located at the base of said cylinder;

said cylinder being vertically connected to said housing at the rear thereof, said cylinder providing a storage space for said mast;

a flash means pivotally mounted at the top of said mast; and means for actuating said flash means.

3. Flash apparatus of the type described comprising:
(a) a housing adapted to contain apparatus for generating a flash-triggering signal;
(b) a cylindrical tube attached to one end of said housing and forming a handle by which said housing can be transported;
(c) a telescopic mast mounted coaxially in said tube and attached to one end of the latter, said mast having a retracted position at which only a tip porton projects from the other end of said tube and is adjacent said housing, and an extended position at which said tip portion projects from said other end of said tube and is remote from said housing;
(d) light means mounted on said tip portion of said mast; and
(e) a wire having one end electrically connected to said light means, and the other end extending into said housing and adapted to be connected to the flash triggering apparatus therein for electrically connecting the latter to said light means;
(f) said wire being precoiled about said mast between the latter and the inside of said cylindrical tube when said mast is in its retracted position.

4. Flash apparatus of the type described comprising:
(a) a tapered housing adapted to contain apparatus for generating a flash-triggering signal;
(b) cylindrical tube having remote ends and an intermediate portion;
(c) means connecting said remote ends of said tube to said housing at the tapered end thereof;
(d) said housing being spaced from said intermediate portion of said tube to provide clearance whereby said tube defines a handle by which said housing can be transported;
(e) a base-section tube of substantially the same length as said cylindrical tube and coaxially mounted therein so that an annular space is defined by the inside of said cylindrical tube and the outside of said base tube;
(f) a plurality of mast-section tubes in nested coaxial position inside said base-section tube and being so interconnected with each other and with said base-section that said mast-section tubes can be moved axially relative to each other and to said base-section from a retracted position at which only one of said mast-section tubes, termed the tip-section tube for reference, projects substantially from one end of said cylindrical tube, to an extended position at which all of said mast-section tubes project from said one end of said cylindrical tube and define a rigid, self-supporting mast;
(g) light means mounted on said tip-section tube;
(h) a wire having one end electrically connected to said light means and the other end extending into said housing and adapted to be connected to the flash-triggering apparatus for electrically connecting the latter to said light means; and
(i) said wire exiting from said housing adjacent the other end of said cylindrical tube and being helically coiled about said base-section tube in said annular space.

5. Flash apparatus in accordance with claim 4 wherein:
(a) the mounting between said tip and said light means is such that the latter is adjustable relative to the former; and
(b) said housing and said light means are provided with cooperable means for releasably retaining said light means in fixed position on said tip when said mast is in its retracted position.

References Cited by the Examiner

UNITED STATES PATENTS

| | | | |
|---|---|---|---|
| 2,230,458 | 2/41 | Hummert. | |
| 2,278,545 | 4/42 | Gravenstine | 240—8.18 |
| 2,408,764 | 10/46 | Edgerton | 95—11.5 |
| 2,551,710 | 5/51 | Slaughter | 240—51.11 |
| 2,804,541 | 8/57 | Schotz | 249—10.66 |
| 2,868,958 | 1/59 | Bounds | 240—1.3 |
| 2,898,447 | 8/59 | Hanlon | 240—1.3 |
| 3,026,409 | 3/62 | Deisch | 240—1.3 |
| 3,079,490 | 2/63 | Barbieri | 240—11.3 |

FOREIGN PATENTS

| | | |
|---|---|---|
| 740,476 | 11/32 | France. |
| 892,338 | 1/44 | France. |
| 1,112,964 | 11/55 | France. |
| 827,221 | 1/52 | Germany. |

NORTON ANSHER, *Primary Examiner.*